Jan. 18, 1966      J. N. BRADLEY      3,229,744

TUBELESS TIRE WHEEL CONSTRUCTION

Filed July 8, 1964

INVENTOR.
JOHN N. BRADLEY
BY John B. Sowell
ATTORNEY

United States Patent Office 3,229,744
Patented Jan. 18, 1966

3,229,744
TUBELESS TIRE WHEEL CONSTRUCTION
John N. Bradley, Grosse Pointe, Mich., assignor to The Budd Company, Philadelphia, Pa., a corporation of Pennsylvania
Filed July 8, 1964, Ser. No. 381,096
2 Claims. (Cl. 152—381)

This invention relates to wheels for tubeless tires and more particularly to a novel rim construction which permits ease of removal or mounting of tubeless tires having 5° tire bead seats.

It has been the practice to make tubeless tire rims for commercial vehicles substantially as shown in Patent No. 2,817,381. This typical construction may be described as having a large taper rim seat (rim bead seat) preferably of the order of 15° requiring that the gummed tire bead (tire bead seat) be similarly tapered and preferably compression fitted to avoid abrasion.

Heretofore, various wheel and rim designs have been proposed for facilitating the easy removal of tubeless tires. However, these structures have adhered to the principle that the tapered tire bead be substantially the same as the tapered rim bead. These prior art devices having similarly tapered tire and rim bead seats, compression fit and gummed self-sealing beads, have created a condition wherein tubeless tires are locked onto the rim requiring the aid of special power or lever actuated tools to facilitate removal or mounting of a tubeless tire on a rim.

Therefore, it is a principal object of the present invention to provide a tubeless tire wheel construction which facilitates removal or mounting of a tubeless tire thereon.

It is a further object of the present invention to provide a removable side rim tubeless tire wheel having tapered rim seats adapted to engage tire bead seats having a substantially different taper angle.

It is another object of the present invention to provide a wheel structure for a tubeless tire that normally urges a deflated tubeless tire bead to disengage the rim bead seat facilitating hand removal of the tubeless tire from the wheel and permitting insertion of a tube or inflation device therein.

The above and other objects and novel features of the present invention will be apparent from the following description and accompanying drawings in which.

In accordance with the present invention there is provided a wheel disk attached to a drop center rim comprising, a fixed side flange and an intermediate flange, a removable side rim having a side flange affixed to said wheel disk to clamp and compress the bead of a tubeless tire between the removable side rim side flange and the intermediate flange to form a seal therewith, and rim bead seats on said side rims having a tapered seat angle of approximately 9° or more than the tire bead seat angle of the tubeless tire mounted thereon.

Figure 1:
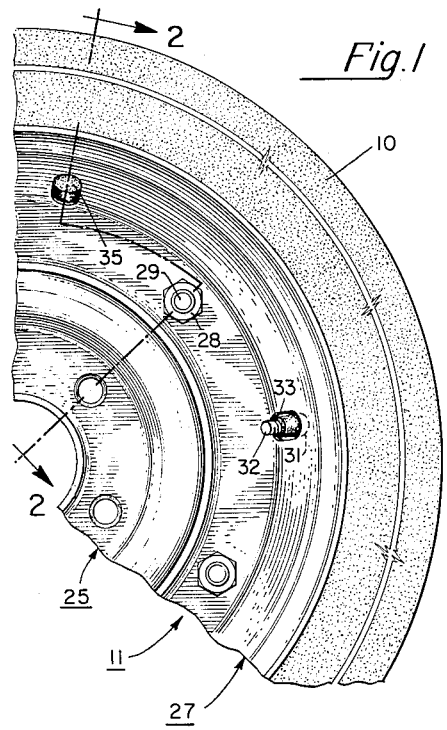
FIG. 1 is a partial front elevation of the preferred embodiment of the tubeless tire wheel.
Figure 2:
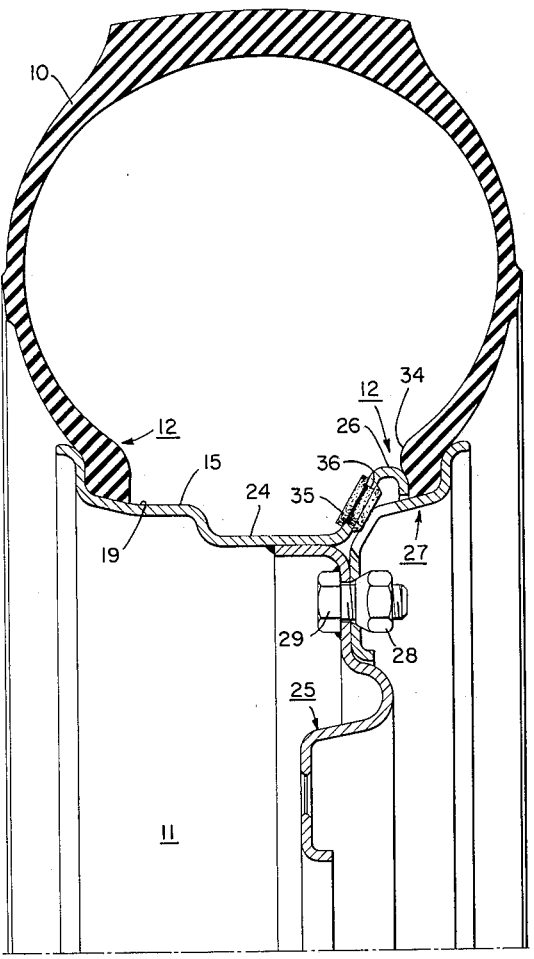
FIG. 2 is a section in elevation of the tire and wheel taken along lines 2—2 of FIG. 1.
Figure 3:
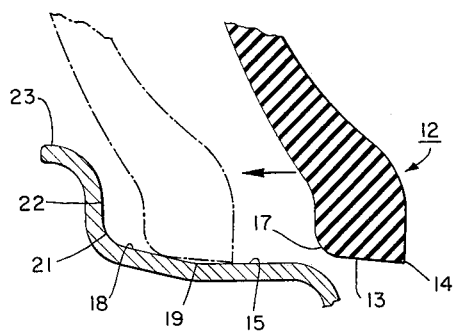
FIG. 3 is an enlarged section of the fixed side rim showing the bead seat angle of the tire relative to the bead seat angle of the rim before the tire is sealed on the rim.
Figure 4:
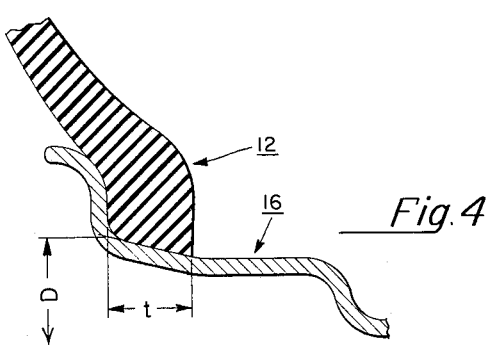
FIG. 4 is an enlarged section of the fixed side rim showing the bead seat angle of the tire seated on the bead seat of the rim.

Refer now to FIGS. 1 to 4 illustrating a preferred embodiment having a standard commercial tubeless tire 10 for passenger vehicles mounted on wheel 11. The bead 12 of the tire is provided with a seat 13 normally having a taper angle of 5° relative to the axis of the wheel. The toe 14 of the tire bead 12 has a diameter greater than the ledge 15 of the fixed side rim 16 enabling the tire bead to be easily mounted on the fixed side rim as shown in dotted lines in FIG. 3. The heel 17 of the tire bead engages the rim bead seat 18 before being fully seated thereon. Rim bead seat 18 has a taper angle of approximately 14° relative to the axis of the wheel which causes the normal 5° taper of the tire bead seat to be expanded outward at the heel 17 as it is inflated. When fully inflated the tire bead will conform to the rim bead seat 18 as shown in FIG. 4 and will assume the 14° taper angle of the rim bead seat.

In the preferred embodiment shown, the toe 14 of the tire bead 12 may be equal to or slightly greater than the diameter of the toe 19 of the fixed side rim 16. The thickness $t$ of the tire bead 12 varies slightly among different manufacturers; however, the rim bead seat 18 is of sufficient length to accommodate all commercially available passenger car tubeless tires having 5° tire bead seats. The contour and shape of heel 21, radial side flange 22 and axial side flange 23 of the fixed side rim 16 are standard to accommodate all commercially available passenger car tubeless tires.

A feature of the present invention concerns the ease of removal of a standard 5° tubeless tire from the improved rim and wheel structure. A conventional 14 inch tubeless tire having a 5° tire bead seat is made 0.078 smaller in diameter than the 5° rim bead seat on which it is intended to be mounted providing a standard compression fit on the rim that seals tightly as well as reduces the axial thrust on the radial side flange. However, such a standard compression fit also assures that the tire bead is locked in place on the rim making hand removal impossible. If the taper angle of the rim bead seat 18 is increased so as to increase the diameter of the heel 21 of the rim bead seat 18 there is an initial increase in the locking effect of the tire bead on the rim. Applicant has discovered that a further increase in the compression fit accomplished by an additional increase in the taper angle of the rim bead seat 18, if accompanied by a reduction of the diameter of the toe 19 of the fixed side rim, will reverse the normal tendency of the tire bead to lock onto the rim and normally urge the tire bead seat 13 to disengage the rim bead seat 18 when the tubeless tire 10 is deflated. In general manufacturing practice both the rim seats and tire seats are manufactured to a tolerance of ±1° which could cause an accumulative error of ±2°. It was observed that when the rim bead seat is increased to an angle of 14° a tire bead having a zero fit at the toe and 5° taper angle could easily be removed by hand from the rim bead seat 18. It is believed that the tendency of the tire bead to release the rim can be assured when the difference in the taper angles of the seats is of the order of 9° or 10°. For example, a conventional 14 inch tubeless tire having a bead diameter of 13.890 inches was mounted on a 14 inch wheel having 14.050 inches diameter D. The compression fit, or interference, was 14.050–13.890 or .160 inch. It was observed that this amount of compression fit at the heel is approximately twice the aforementioned standard compression fit of .078 inch. In this embodiment the taper angle of the rim bead seat was approximately 14° and there was no compression fit at the toe of the tire bead. The fixed side rim 16 was not provided with the usual hump or recess to prevent roll-off which would interfere with hand removal. It was found that the ledge 15 and the double compression fit of the tire bead on the rim was sufficient to prevent the inside tire bead from peeling or rolling off the rim bead seat of the inside fixed side rim.

Ledge 15 of the inside side rim 16 is connected to a drop center portion 24 which is supported by a formed disk 25 affixed thereto. Formed disk 25 is adapted to be mounted on the radial flange of a hub, but could be a continuation of a hub. Connected to the preferred rim shown, and forming a continuation of drop center portion 24, is an intermediate flange 26 having an inverted U-shape. This inverted U-shape flange provides a completely smooth outside diameter which does not tend to break or tear the fragile gummed bead 12 of the tubeless tire.

An outside removable side rim 27, preferably having the same contour as the inside fixed side rim 16, is attached to an outer radial portion of the formed disk 25 by means of cap nuts 28 cooperating with bolts 29. An aperture 31 is provided in the drop center portion 24 to receive an air valve 32. Air valve 32 extends outward at an angle of approximately 30° to the axis of the wheel through an aperture 33 provided in outside removable side rim 27. When cap nuts 28 are drawn up tight the outside tire bead 12 is compressed between the radial side flange 27 and the U-shape intermediate flange 26 providing a seal at the inner face 34 of the outside tire bead.

Another feature of the present invention concerns the elimination of the fifth tire or spare tire which usually is provided with a passenger vehicle. Instead of providing the usual spare tire it is only necessary that a standard tube or preferably a reinforced tube be provided for insertion into the tubeless tire. If the tubeless tire 10 is deflated by puncture, rupture or other means it may be repaired by simple hand tools without removal from the novel wheel or it can be completely removed by hand from the novel wheel without the requirement of special tools. Deflation of the tubeless tire causes the inside tire bead 12 to normally tend to disengage the rim bead seat 18 of the inside fixed side rim 16 as a result of the difference in taper angles of the bead seats. The outside tire bead 12 is clamped between the intermediate flange 26 and the removable outside side rim 27. Removal of the cap nut 28 permits the removable side rim 27 to be removed from the disk 25 and the tire 10 breaking the seal between the interface 34 of the outside tire bead 12. In the preferred embodiment the rim bead seat of the removable outside side rim is similar to rim bead seat 18; however, this bead seat could be made of any desirable shape or size that would support the outside tire bead 12 and avoid any tendency of the tire bead to lock on the rim. After both bead seats are free from the rim the inside tire bead may be placed in the drop center portion 24 or completely removed from the wheel 11 to provide access to the interior of the tire. The interior of the tire is inspected, and any foreign objects present therein are removed. Before remounting the tire 10 push-out plug valve 35 is removed from aperture 36 by pushing the plug valve inward by hand or with the aid of a sharp object such as a screw driver opposite to the normal forces created by air pressure in the tubeless tire. A reinforced tube is placed inside the tire 10 and the tire is mounted on the wheel with the air valve of the tube inserted through the aperture 36. Removable outside side rim 27 is then replaced and the tube is inflated to provide a fully operable pneumatic tire. It has been found that a reinforced inner tube inflated by a small air bomb will permit several hundred miles of operation upon a tire which has a blown side wall or will render a tubeless tire with a usual type puncture fully operable.

It will be noted that the tubeless tire forms a seal on the inside fixed side rim at the rim bead seat 18 and that bead 12 is sealed at the outside removable inside rim by the interface 34 against the intermediate U-shaped flange 26. It is apparent that the purpose of the U-shaped flange 26 serves to lock the outside tire bead in place and form a seal therewith as well as to prevent roll-off or peeling of the outside tire bead when the vehicle subjects the tire bead to axial thrust forces. While there is no necessity in the preferred embodiment for locking the inside tire bead on the rim this could be accomplished by making the U-shaped intermediate flange 26 a separate member so that it would serve as a spacer and a seal between the two tire beads 12. Other modifications could be made in the described structure without departing from the scope of the present invention which is limited only by the terms of the appended claims.

What is claimed is:

1. The combination of a rim and a pneumatic tubeless tire mounted thereon comprising:
   a continuous fixed rim section having,
      an axial side flange portion,
      an inside radial side flange portion,
      a 14° rim bead seat portion,
      an axial ledge portion,
      a drop center portion,
      and a U-shaped intermediate flange portion terminating in a radially inward direction;
   a removable side rim section having,
      an axial side flange portion,
      an outside radial side flange portion,
      a 14° rim bead seat portion,
      and a radial mounting portion;
   a formed disk section attached to said drop center portion of said fixed rim section;
   bolt means on said formed disk section mounting said removable side rim section to said formed disk portion;
   and a tubeless tire mounted on said 14° rim bead seat portions of said rim sections having,
      5° tire bead seats,
      toes having a diameter approximately equal in diameter to the toe of the rim bead seats, and
      a heel having a diameter at least .100 inch smaller than the diameter of the heel of the rim bead seat, whereby said tire bead seat of said tubeless tire tends to normally disengage from said rim bead seat.

2. A removable side rim drop center disk wheel having a tubeless tire mounted thereon comprising;
   a formed disk;
   a single piece rim attached to said disk and provided with,
      a fixed intermediate flange,
      a fixed side flange and,
      a drop center section connected between said flanges;
   a removable side rim having a side flange affixed by attachment means to said disk;
   rim bead seats on said rims oppositely inclined at an angle of about 14° to the axis of said wheel;
   a tubeless tire having tire beads with oppositely inclined tire bead seats at an angle of about 5° to the axis of said wheel;
   said rim bead seats being of approximately equal diameter to said tire bead seat at the toe of said seats, said rim bead seats being of greater diameter than said tire bead seat at the heel of said seat before said tire is mounted whereby the compression force between tire and rim after said tire is mounted and deflated urges said bead of said tire to disengage said rim bead seat, one of said tire beads being clamped between said side flange of said removable side rim and said fixed intermediate flange to restrain disengagement of the tire and the rim bead seat; and an air valve for inflating said tubeless tire to restrain disengagement of the tire and the rim bead seat on said single piece rim.

References Cited by the Examiner
UNITED STATES PATENTS

| | | | |
|---|---|---|---|
| 1,444,653 | 2/1923 | Boyce | 152—398 |
| 1,862,313 | 6/1932 | La Brie | 152—381 X |
| 1,939,935 | 12/1933 | Wagenhorst | 152—398 |
| 2,731,064 | 1/1956 | Powers | 152—381 X |
| 2,866,494 | 12/1958 | Sanderson | 156—97 |
| 2,974,715 | 3/1961 | Scares et al. | 156—97 |

ARTHUR L. LA POINT, *Primary Examiner.*

C. W. HAEFELE, *Assistant Examiner.*